United States Patent [19]

Jain

[11] Patent Number: 4,959,766

[45] Date of Patent: Sep. 25, 1990

[54] AC/DC CONVERTER USING RESONANT NETWORK FOR HIGH INPUT POWER FACTOR

[75] Inventor: Praveen K. Jain, Nepean, Canada

[73] Assignee: National Research Council of Canada/Conseil National de Recherches du Canada, Ottawa, Canada

[21] Appl. No.: 376,854

[22] Filed: Jul. 7, 1989

[51] Int. Cl.⁵ .............................................. H02M 7/06
[52] U.S. Cl. ........................................ 363/48; 363/86; 363/126
[58] Field of Search ...................... 363/44, 45, 46, 47, 363/48, 84, 85, 86, 125, 126, 128

[56] References Cited

U.S. PATENT DOCUMENTS

| | | | |
|---|---|---|---|
| 3,906,337 | 9/1975 | Depenbrock | 363/48 |
| 4,222,096 | 9/1980 | Capewell | 363/126 |
| 4,369,490 | 1/1983 | Blum | 363/48 |

Primary Examiner—Peter S. Wong
Attorney, Agent, or Firm—Francis W. Lemon

[57] ABSTRACT

An AC/DC converter is provided, suitable for use in an advanced single phase, sine wave voltage, high frequency power distribution system, such as that used on a 20 kHz Space Station Primary Electrical Power Distribution System. The converter comprises a transformer, a resonant network, a current controler, a diode rectifier and an output filter. The voltage source is converted into a sinusoidal current source. The output of this current source is rectified by the diode rectifier and is controlled by the current controller. The controlled rectified current is then filtered by the output filter to obtain a constant voltage across the load.

10 Claims, 6 Drawing Sheets

AC/DC CONVERTER USING RESONANT NETWORK FOR HIGH INPUT POWER FACTOR

TECHNICAL FIELD

This invention relates to an AC/DC converter.

Background Of The Invention

In an advanced single phase, sine-wave voltage, high frequency power distribution system, for example, such as that used in a 20 kHz Space Station Primary Electrical Power Distribution System, power conversion from AC to DC is required. Some of the basic requirements for this conversion are:
1. High efficiency
2. Light weight and small volume
3. Regulated output voltage
4. Close to unity input power factor
5. Distortion-less input current
6. Soft-starting (low input surge current)
7. Low EMI, and
8. High reliability There are a number of conventional approaches to the design of AC/DC converters. The most common approaches are briefly discussed below:

Link AC/DC Converters

In this type of converter, the AC output voltage is first converted into unregulated DC voltage. The unregulated voltage is then converted to regulated DC voltage by using a known DC/DC converter topology. To meet the input requirements (distortion-less input current and close to unity power factor) and output requirements (ripple free constant DC voltage), link converters employ several conversion stages and have a high count of power components. Therefore, this type of converter has a low efficiency and reliability and a high weight and volume.

Switch Mode Rectifier (SMR)

The SMR circuit has been used in low frequency applications for AC/DC conversion with a good quality input current waveform. In this approach an active filter is used at the output of the diode rectifier to reduce the size of input filter which is very bulky at lower frequencies. The active filter used in a SMR is essentially a boost or buck converter whose switching frequency is approximately 500 times greater than the input supply frequency, to eliminate the lower order harmonics from the input current. Therefore, this circuit in a high frequency power distribution system, where the distribution frequency is in the order of 20 kHz, would be very inefficient due to very high switching losses of the buck or boost converter at these elevated switching frequencies. In addition, this circuit has all the aforementioned drawbacks of any link AC/DC converter.

Controlled Rectifier

In this rectifier the output DC voltage is controlled by controlling the delay angle of the thyristors. This circuit generates large current harmonics in the supply lines, has a poor input power factor over the full range of voltage control, and has high EMI.

None of the above approaches entirely satisfy the main design objectives of AC/DC converters for high frequency power distribution system in, for example, space applications.

SUMMARY OF THE INVENTION

According to the present invention there is provided an AC to DC converter comprising:

(a) an input transformer for connection to a single phase, high frequency, sinusoidal wave form, AC voltage source, the transformer, in operation, providing a matching output voltage for, and isolating from, the AC voltage source, (b) a resonant network for converting the single phase, high frequency, sinusoidal wave form, AC voltage to a sinusoidal, high frequency bi-directional current output, (c) a current controller connected in parallel to the resonant network to receive the sinusoidal high frequency current output therefrom and provide the desired output current from the converter.

(d) a diode rectifier connected in parallel with the current controller, and for converting the bi-directional current into a unidirectional current output, and (e) an output filter connected to the rectifier to provide an essentially ripple free, substantially constant voltage, DC output.

The resonant network may be connected to receive the output matching voltage.

The resonant network may be for connection to the AC voltage source and for passing the high frequency current output, generated by the resonant network, to the transformer.

The input transformer may have a primary and a secondary winding, and the resonant network may comprise two capacitors, one capacitor being connected in series with the primary winding of the transformer, and the other capacitor being connected in series with the secondary winding of the transformer.

The resonant network may comprise an inductor and a capacitor, and the capacitor may be connected in series to the output of the inductor.

The resonant network may further comprise a capacitor connected in parallel with the input transformer.

The current controller may be a bi-directional switch.

The bi-directional switch may be a thyristorized bi-directional switch.

The output filter may be a capacitor.

The output filter may be a $\pi$ network comprising a capacitor, an inductor and a capacitor.

BRIEF DESCRIPTION OF THE DRAWING

In the accompanying drawings which illustrate, by way of example, embodiments of the present invention.

DETAILED DESCRIPTION

Figure 1:
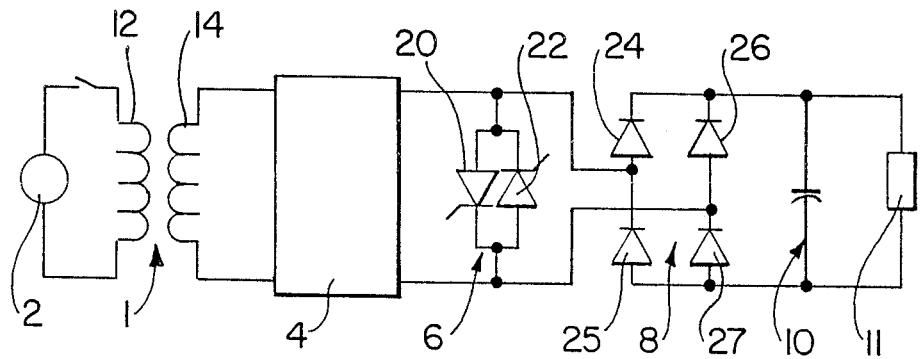
FIG. 1 is a schematic diagram of an AC to DC converter.

In FIG. 1 there is shown an AC to DC converter comprising:

(a) an input transformer, generally designated 1, for connection to a single phase, high frequency, sinusoidal wave form, AC voltage source 2, the transformer 1, in operation, providing an output matching voltage for, and isolating, the AC voltage source 2, (b) a resonant network, generally designated 4, for converting the single phase, high frequency, sinusoidal wave form AC voltage to a sinusoidal, high frequency bi-directional current output, (c) a current controller, generally designated 6, connected in parallel to the resonant network 4 to receive the sinusoidal high frequency current output therefrom and provide the desired output current from the converter, (d) a diode rectifier, generally designated 8, connected in parallel with the current controller 6 and for converting the bi-directional current into a unidirectional current output, and (e) an output filter, generally designated 10, connected to the rectifier 8 to provide an essentially ripple free, substantially constant voltage, DC output to a load 11.

Figure 2:
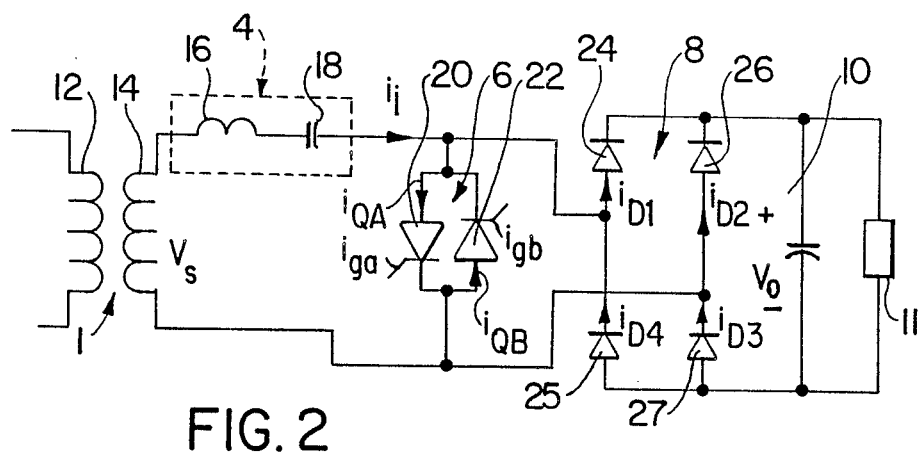
FIG. 2 is one form of a resonant circuit that may be used in the converter shown in FIG. 1.

As shown in FIG. 2, in some embodiments of the present invention the resonant network comprises an inductor 16 and a capacitor 18, with the capacitor 18 connected in series to the output of the inductor 16.

The current controller 6 is a thyristorized, bi-directional switch comprising two anti-parallel, thyristor switches 20 and 22.

The diode rectifier comprises four diodes 24 to 27.

The output filter 10 comprises a capacitor.

In operation a single phase, high frequency, sinusoidal wave form, AC voltage from source 2 is applied to the primary winding 12 of the transformer 1 and the secondary winding 14 providing a matching output voltage for, and isolates the remaining circuit from, the source 2.

The matching output from the secondary winding 14 of the transformer 1 is fed to the inductor 16. Both of the series components of the resonant network 4, that is, the inductor 16 and the capacitor 18 are tuned closely to the operating frequency of the input from the single phase, high frequency, sinusoidal wave form, AC voltage source 2, so that these components offer close to zero impedance for fundamental current and very high impedance to harmonic currents to keep the total harmonic current distortion of the input current to a minimum. This also ensures an input power factor that is close to unity.

The current controller 6 controls the amount of output current from the resonant network 4 that is needed to be rectified, to achieve the output voltage and current desired at the load 11.

The output filter 10 smooths the ripples generated by the diode rectifier 8 and provides a constant voltage to the load 11.

Figure 3:
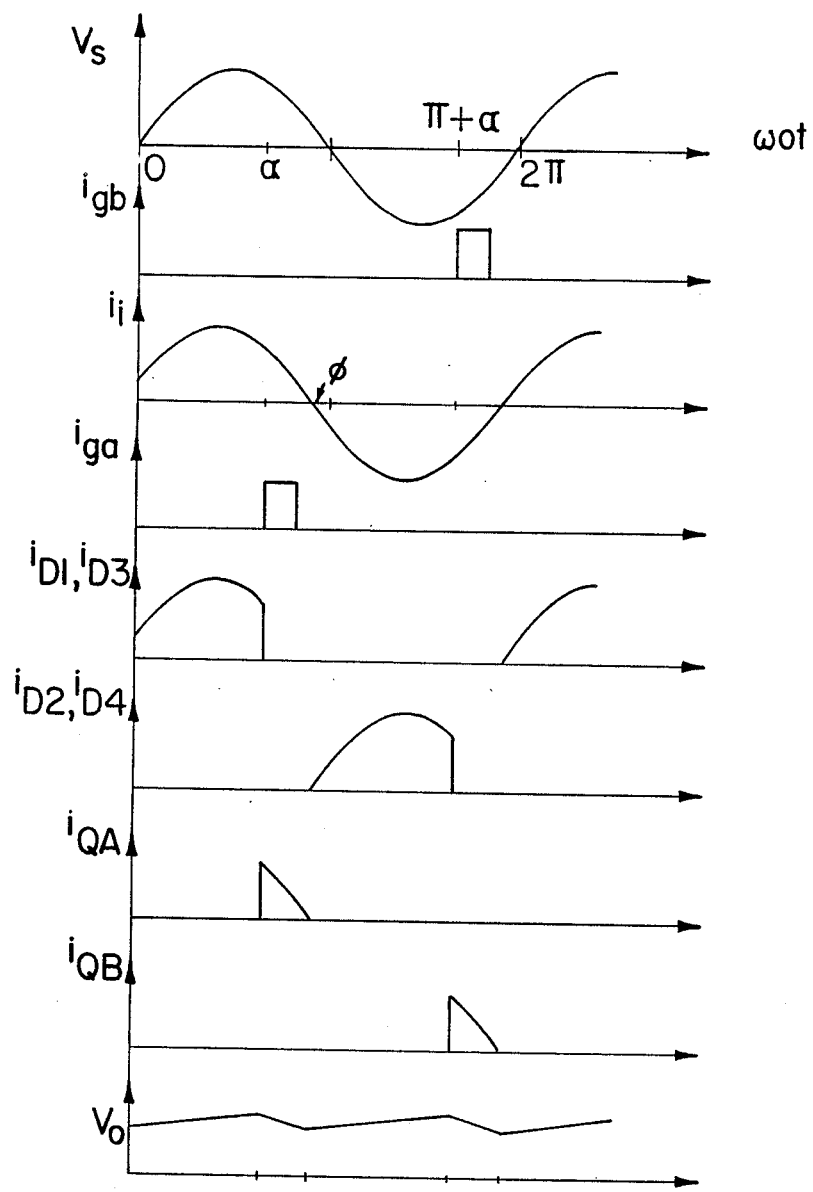
FIG. 3 shows various wave forms generated in the converter shown in FIG. 2.

A description of the operation of the AC/DC converter shown in FIG. 2 will now be given with reference to FIG. 3.

At the position of the cycle where $w_o t=0$, diodes 24 and 27 are conducting and the input resonant current $i_i$ is charging the output capacitor 10. This input current keeps charging the capacitor 10 until $w_o t=\alpha$, where the switch 20 is triggered. At this point, the input current is instantaneously transferred to the switch 20 from the diode rectifier 8 to end the charging period of the output capacitor 10. At $w_o t=\pi-\phi$, the resonating input current, flowing through switch 20, goes to zero, thereby extinguishing its conduction. At this instant, diodes 25 and 26 become forward biased and carry the negative input resonant current. The rectification action of the diodes 25 and 26 changes the direction of this current at the output and starts the charging of the capacitor 10. At $w_o t=\pi+\alpha$, the current flowing through diodes 25 and 26 is transferred to switch 22 by triggering it to end the charging period. Switch 22 conducts until the input resonant current flowing through it goes to zero. At this point, diodes 24 and 27 start to conduct once again and a new cycle begins.

Figure 4:
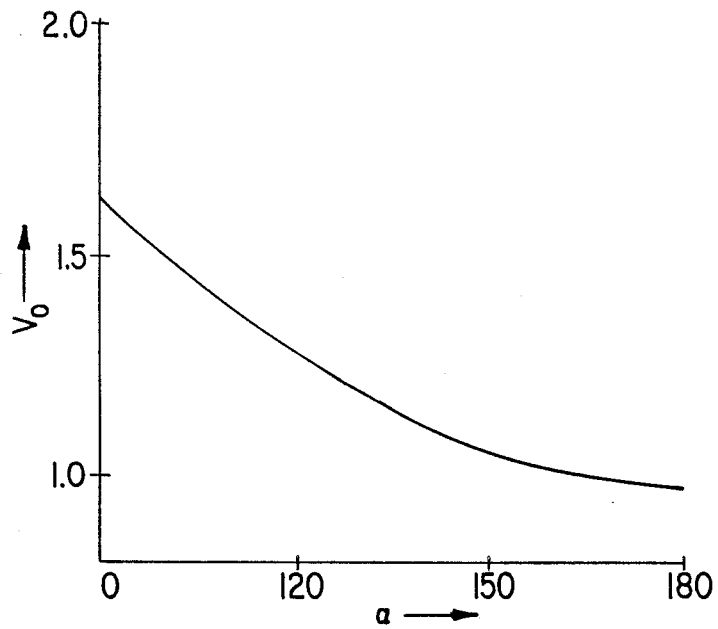
FIG. 4 shows the normalized output voltage of the converter shown in FIG. 2 as a function of the firing angle of the current controller.

Referring now to FIGS. 2 and 4, in this type of converter the control of the output voltage is provided by controlling the firing angle ($\alpha$) of the current controller 6. FIG. 4 shows a typical curve for the output voltage of this type of converter as a function of the angle.

At $\alpha=180°$, neither of the thyristor switches 20 and 22 of the current controller. 6 are conducting, and energy stored in the components 16 and 18 of the resonant network 4 is limited by the output load. For any other value of the $\alpha\neq180°$, excess energy is stored in the components 16 and 18 of the resonant network 4 for a duration of $(\pi-\alpha)$ in each half cycle in which either one of the thyristor switches 20 and 22 is conducting. This excess energy results from the fact that the equivalent quality factor of the resonant network 4 has increased due to the partial short circuiting of the output load 11. The excess energy stored in the components 16 and 18 of the resonant network 4 is released to the output load 11 to increase the output voltage level during the interval of each half cycle.

As seen in FIG. 4, the output voltage of the converter increases as the firing angle ($\alpha$) decreases. An operating point, therefore, is chosen for $\alpha\neq180°$ to provide the control of output voltage ($V_o$).

Figure 5:
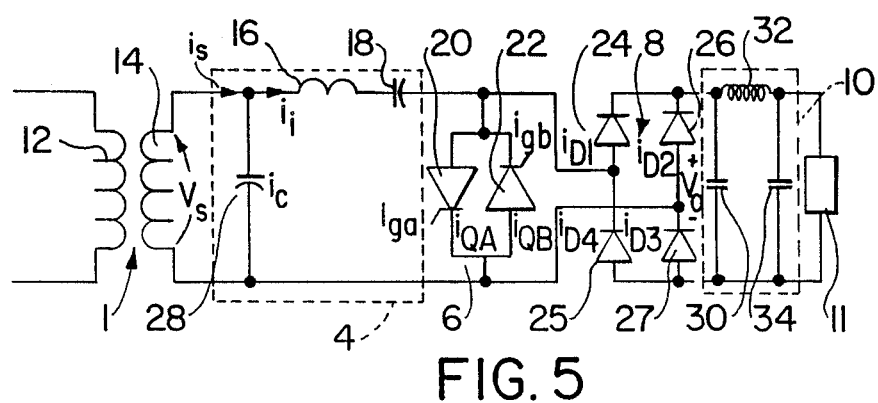
FIG. 5 is a different form of resonant circuit that may be used in the converter shown in FIG. 1.
Figure 6:
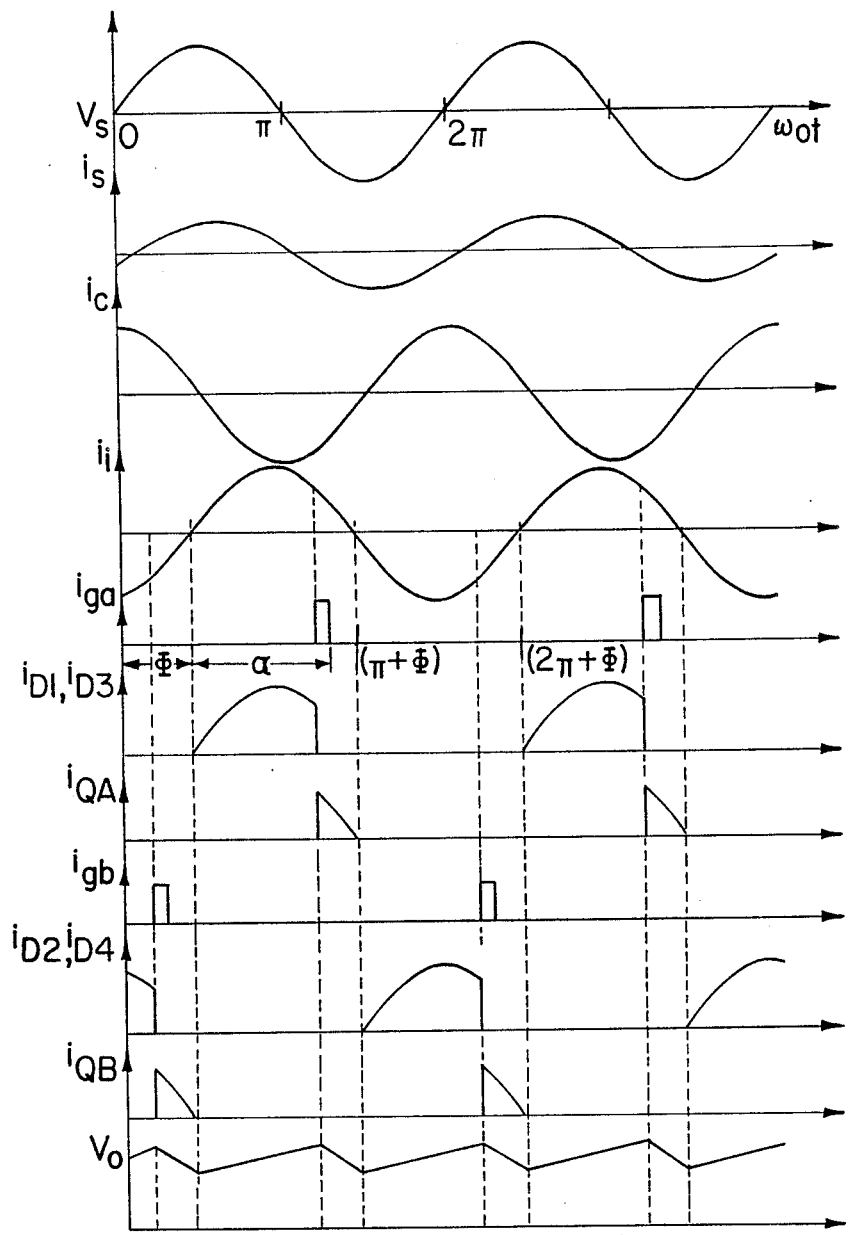
FIG. 6 shows the operating principle of the circuit shown in FIG. 5.

In FIGS. 5 to 6, similar parts to those shown in FIG. 1 and 2 are designated by the same reference numerals and the previous description is relied upon to describe them. However, as will be seen, while the components and their individual functions may be the same as those shown in FIG. 1 and 2, these components function collectively on different principles thereto.

In FIG. 5, the resonant circuit 4 further comprises a capacitor 28 connected in parallel with the input transformer 1. In operation a single phase, high frequency, sinusoidal wave form, AC voltage from source 2 is applied to the primary winding 12 of the transformer 1 and the secondary winding 14 provides a matching output voltage for, and isolates the remaining circuit, from source 2.

The components 28, 16 and 18 of the resonant circuit 4 are selected in such a way that a close to unity input power factor, and a sinusoidal AC current of near constant amplitude through components 16 and 18, under full-load to short-circuit conditions, are obtained when the matching output voltage from the secondary winding 14 of the transformer 1 is fed to the resonant circuit 4.

The current controller 6 controls the amount of output current, from the resonant circuit 4, that is needed to be rectified, to achieve the output voltage and current desired at the load 11.

The output filter 10 which consists of a capacitor 30, an inductor 32, and a capacitor 34, provides a low ripple constant output voltage to the load 11.

A description of the operation of the AC/DC converter shown in FIG. 5 will now be given with reference to FIG. 6.

At the position of the cycle where $w_o t = \phi$, diodes 24 and 27 are conducting and the input resonant current $i_i$ is charging the output capacitor 30. This input current keeps charging the capacitor 30 until $w_o t = \phi + \alpha$, where the switch 20 is triggered. At this point, the input current is instantaneously transferred to the switch 20 from the diode rectifier 8 to end the charging period of the output capacitor 30. At $w_o t = \pi + \phi$, the resonating input current flowing through switch 20, goes to zero, thereby, extinguishing its conduction. At this instant, diodes 25 and 26 become forward biased and carry the negative input resonant current. The rectification action of the diodes 25 and 26 changes the direction of this current at the output and starts the charging of the capacitor 30. At $w_o t = \phi + \alpha + \pi$, the current flowing through diodes 25 and 26 is transferred to switch 22 by triggering it to end the charging period. Switch 22 conducts until the input resonant current flowing through it goes to zero. At this point, diodes 24 and 27 starts to conduct once again and a new cycle begins.

Figure 7:
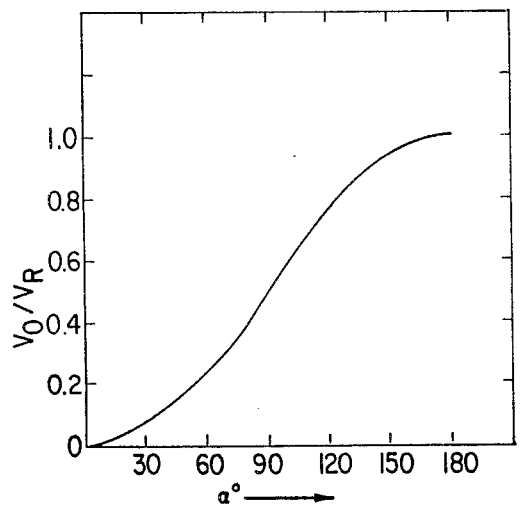
FIG. 7 shows the control of the output voltage, of the circuit shown in FIG. 5, as a function of angle $\alpha$.

Referring now to FIG. 5 and 7, in this type of converter the control of the output voltage is provided by controlling the firing angle ($\alpha$) of the current controller 6. FIG. 7 shows a typical curve for the output voltage of this type of converter as a function of the angle.

At $\alpha = 180°$, neither of the switches 20 and 22 of the current controller 6 are conducting, all the current flowing through the resonant components 16 and 18 is rectified by the rectifier 8, thereby, producing the maximum output voltage at the load 11. As described earlier, the resonant components 28, 16 and 18 are selected in such a way that the resonating current flowing through 16 and 18 has a near constant amplitude under full-load to short-circuit conditions. For $\alpha \neq 180°$, when either switches 20 and 22 of the current controller 6 is conducting in each half-cycle, for a duration of $(\pi - \alpha)$, a portion of the current is shunted by the current controller 6. Thereby, reducing the amount of the current at the input of the rectifier 8. This lowers the output voltage across the load 11.

As seen in FIG. 7, the output voltage of the converter, which is shown as output voltage ($V_o$)/Rated Output voltage $V_R$, decreases as the firing angle ($\alpha$) decreases.

Figure 8:
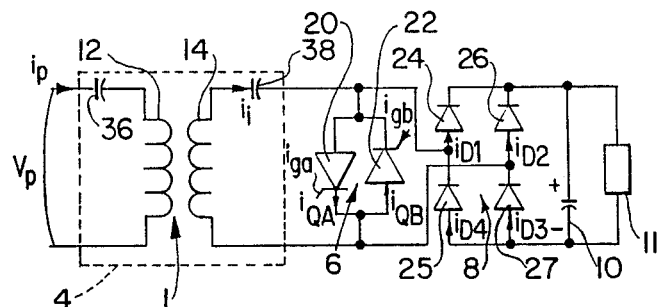
FIG. 8 is yet another different form of resonant circuit to that shown in FIG. 1.

In FIG. 8, the resonant circuit 4 comprises the capacitors 36 and 38, capacitor 36 being connected in series with the input of the primary winding 12 of the transformer 1, and the other capacitor 38 being connected in series with the secondary winding 14 of the transformer 1.

The capacitors 36 and 38, and the transformer 1 are selected in such a way that a close-to-unity input power factor, and a sinusoidal AC current wave form of near constant amplitude through capacitor 38, under full-load to short-circuit conditions, are obtained when a single-phase, high frequency, sinusoidal wave form AC voltage from source 2 is applied to the series combination of the capacitor 36 and the primary winding 12 of the transformer 1.

The current controller 6 controls the amount of the output current, from the resonant circuit 4, that is needed to be rectified, to achieve the output voltage and current desired at the load 11.

The output filter 10 provides a low ripple constant output voltage to the load 11.

Figure 9:
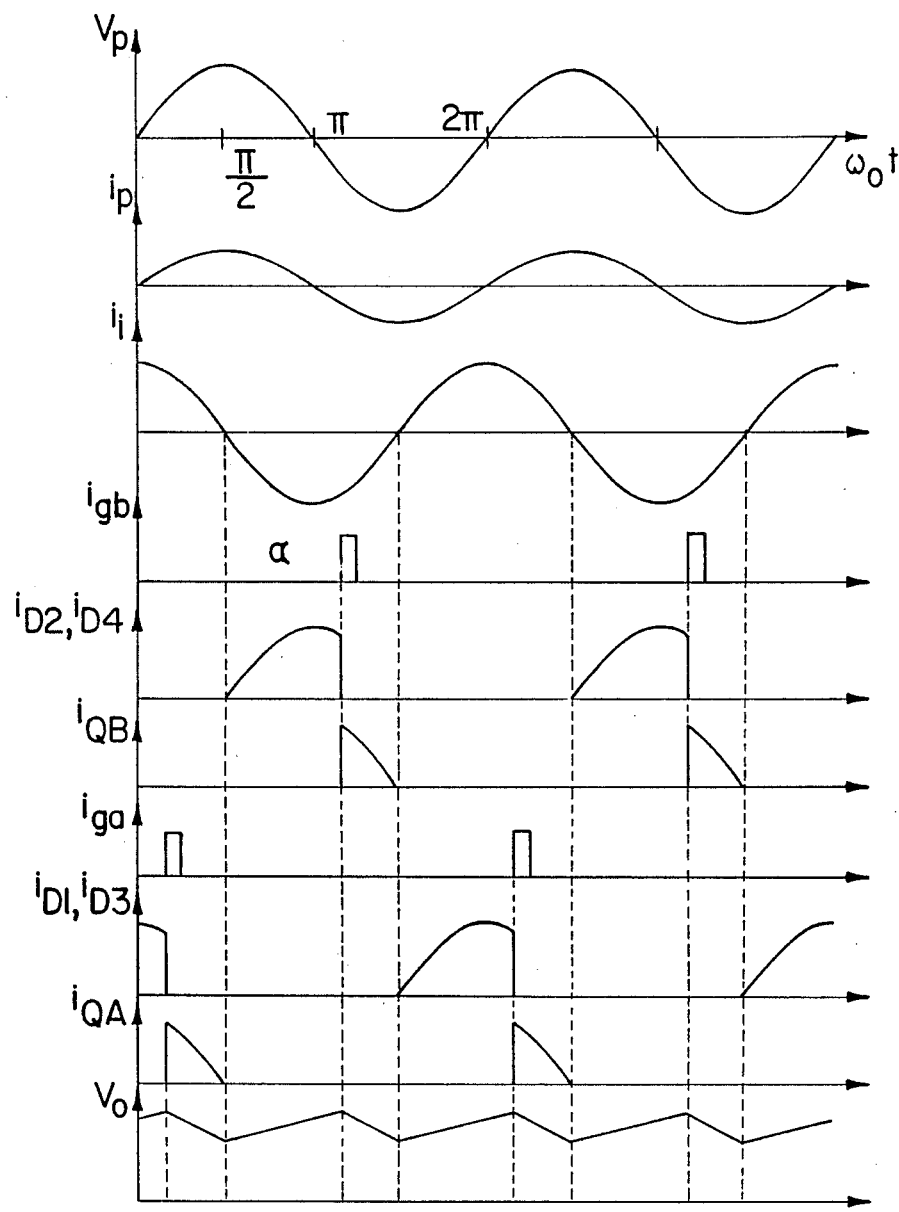
FIG. 9 shows the operating principle of the circuit shown in FIG. 8.

A description of the operation of the AC/DC converter shown in FIG. 8 will now be given with reference to FIG. 9.

At the position of the cycle where $w_o t = \pi/2$, the resonating input current ii goes to zero and forward biases the diodes 25 and 26. The rectification action of the diodes 25 and 26 changes the direction of this current at the output and starts to charge the capacitor 10. At $w_o t = \pi/2 + \alpha$, the current flowing through diodes 25 and 26 is transferred to switch 22 by triggering it to end the charging period. Switch 22 conducts until the input resonant current flowing through it goes to zero. At this point, diodes 24 and 27 start to conduct and the charging of the capacitor 10 begins. At $w_o t = 3\pi/2 + \alpha$, switch 20 is triggered to end the charging period. The input current $i_i$ is now carried by the switch 20. Switch 20 conducts until, the current flowing through it goes to zero. At this point, diodes 25 and 26 start to conduct once again and a new cycle begins.

The output voltage of this converter is controlled by varying the firing angle ($\alpha$) in a similar manner that as shown in FIG. 7.

Figure 10:
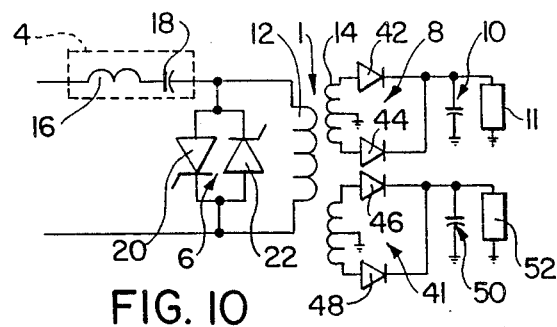
FIG. 10 is a form resonant circuit to that shown in FIG. 1 having two outputs.

In FIG. 10, wherein the circuit components function in a similar manner as the corresponding components described with reference to FIG. 2, the resonant circuit 4 and the current controller 6 are on the input side to the primary winding 12 of the transformer 1.

The transformer 1 has two secondary windings 14 and 40, connected to two diode rectifiers 8 and 41 respectively, each diode rectifier comprising diodes 42, 44 and 46, 48 respectively. The diode rectifiers 8 and 41 are connected to output filters 10 and 50 respectively, which in turn are connected to loads 11 and 52 respectively.

In this manner two or more loads, such as loads 11 and 52, may be provided with regulated DC power.

What is claimed is:
1. An AC to DC converter comprising:
 (a) an input transformer for connection to a single phase, high frequency, sinusoidal wave form, AC voltage source, the transformer, in operation, providing a matching output voltage for, and isolating from, the AC voltage source,
 (b) a resonant network for converting the single phase, high frequency, sinusoidal wave form, AC voltage to a sinusoidal, high frequency bi-directional current output,
 (c) a current controller connected in parallel to the resonant network to receive the sinusoidal high frequency current output therefrom and provide the desired output current from the converter,
 (d) a diode rectifier connected in parallel with the current controller, and for converting the bi-directional current into a unidirectional current output, and
 (e) an output filter connected to the rectifier to provide an essentially ripple free, substantially constant voltage DC output.

2. A converter according to claim 1, wherein the resonant network is connected to receive the output matching voltage.

3. A converter according to claim 1, wherein the resonant network is for connection to the AC voltage source and for passing the high frequency current output, generated by the resonant network, to the transformer.

4. A converter according to claim 1, wherein the input transformer has a primary and a secondary winding, and the resonant network comprises two capacitors, one capacitor being connected in series with the primary winding of the transformer, and the other capacitor being connected in series wit the secondary winding of the transformer.

5. A converter according to claim 2, wherein the resonant network comprises an inductor and a capacitor, and the capacitor is connected in series to the output of the inductor.

6. A converter according to claim 5, wherein the resonant network further comprises a capacitor connected in parallel to the input to the secondary winding of the input transformer.

7. A converter according to claim 1, wherein the current controller is a bi-directional switch.

8. A converter according to claim 7, wherein the bi-directional switch is a thyristorized bi-directional switch.

9. A converter according to claim 1, wherein the output filter is a capacitor.

10. A converter according to claim 1, wherein the output filter is a $\pi$ filter comprising a capacitor, an inductor, and a second capacitor.

* * * * *